US012170054B2

(12) United States Patent
Moon et al.

(10) Patent No.: US 12,170,054 B2
(45) Date of Patent: Dec. 17, 2024

(54) INTEGRATED CIRCUIT, DISPLAY DEVICE, AND METHOD OF DRIVING THE DISPLAY DEVICE

(71) Applicant: Samsung Display Co., LTD., Yongin-si (KR)

(72) Inventors: Dong Won Moon, Yongin-si (KR); Min Kyu Park, Yongin-si (KR); Dong Hwan Lee, Yongin-si (KR); Weon Jun Choe, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/379,889

(22) Filed: Oct. 13, 2023

(65) Prior Publication Data

US 2024/0127743 A1 Apr. 18, 2024

(30) Foreign Application Priority Data

Oct. 14, 2022 (KR) ........................ 10-2022-0132601
May 11, 2023 (KR) ........................ 10-2023-0061361

(51) Int. Cl.
*G09G 3/32* (2016.01)
*G09G 3/20* (2006.01)
*G09G 3/3233* (2016.01)

(52) U.S. Cl.
CPC ............. *G09G 3/32* (2013.01); *G09G 3/2096* (2013.01); *G09G 3/3233* (2013.01); *G09G 2310/0297* (2013.01); *G09G 2310/08* (2013.01); *G09G 2320/0276* (2013.01);
(Continued)

(58) Field of Classification Search
CPC ............. G09G 3/32; G09G 2310/0297; G09G 2310/08; G09G 2320/0276; G09G 2320/0285; G09G 2320/0626
See application file for complete search history.

(56) References Cited

U.S. PATENT DOCUMENTS 10,262,582 B2 4/2019 Han
11,189,222 B1 * 11/2021 Aogaki ................ G09G 3/3208
11,386,828 B2 7/2022 Kim et al.
(Continued)

FOREIGN PATENT DOCUMENTS

KR 1020210043046 A 4/2021
KR 1020220001034 A 1/2022
(Continued)

*Primary Examiner* — Lixi C Simpson
(74) *Attorney, Agent, or Firm* — CANTOR COLBURN LLP

(57) ABSTRACT

A display device includes a compensation value determiner which generates final compensation values for an input image, a timing controller which receives input grayscales of the input image and generate output grayscales by applying the final compensation values to the input grayscales, and a pixel unit which displays an output image corresponding to the output grayscales using pixels. The compensation value determiner determines weights based on display frequencies, display brightnesses, and the input grayscales, the compensation value determiner determines compensation values based on the display frequencies and positions of the pixels, and the compensation value determiner generates the final compensation values by applying the weights to the compensation values.

30 Claims, 11 Drawing Sheets

(52) U.S. Cl.
CPC ............... *G09G 2320/0285* (2013.01); *G09G 2320/0626* (2013.01); *G09G 2360/16* (2013.01)

(56) References Cited

U.S. PATENT DOCUMENTS

| | | | | |
|---|---|---|---|---|
| 11,423,834 | B2 | 8/2022 | Park et al. | |
| 2006/0012606 | A1* | 1/2006 | Hiraki .................. | G09G 3/2011 345/590 |
| 2017/0124934 | A1* | 5/2017 | Verbeure .............. | G09G 3/3611 |
| 2019/0156728 | A1* | 5/2019 | Yu ........................ | G09G 3/2092 |
| 2021/0256893 | A1 | 8/2021 | Moon et al. | |

FOREIGN PATENT DOCUMENTS

| | | | |
|---|---|---|---|
| KR | 102421475 | B1 | 7/2022 |
| KR | 102425795 | B1 | 7/2022 |

* cited by examiner

INTEGRATED CIRCUIT, DISPLAY DEVICE, AND METHOD OF DRIVING THE DISPLAY DEVICE

This application claims priority to Korean Patent Application No. 10-2022-0132601, filed on Oct. 14, 2022, and 10-2023-0061361, filed on May 11, 2023, and all the benefits accruing therefrom under 35 U.S.C. § 119, the content of which in its entirety is herein incorporated by reference.

BACKGROUND

1. Field

The disclosure relates to an integrated circuit, a display device, and a method of driving the display device.

2. Description of the Related Art

As information technology develops, importance of a display device, which is a connection medium between a user and information, has been highlighted. Accordingly, a use of a display device such as a liquid crystal display device and an organic light emitting display device is increasing.

The display device may include a plurality of pixels having a same circuit structure as each other. However, as a size of the display device increases, a process deviation between the plurality of pixels may increase. Accordingly, the plurality of pixels may emit light with different luminance with respect to a same input grayscale. In addition, the plurality of pixels may emit light with different luminance with respect to a same input grayscale due to not only the process variation but also other driving conditions of the display device.

SUMMARY

In a display device, different compensation values may be desired to be applied with respect to each of various cases based on process variation or other driving conditions even though a same image is displayed. However, measuring and storing compensation values of all cases in advance may not be desirable because a cost increases due to an increase of a tact time and an increase of a memory capacity.

Embodiments of the invention provide an integrated circuit, a display device, and a method of driving the display device capable of calculating appropriate image compensation values at a minimum cost with respect to various driving conditions.

According to an embodiment of the disclosure, a display device includes a compensation value determiner which generate final compensation values for an input image, a timing controller which receives input grayscales of the input image and generates output grayscales by applying the final compensation values to the input grayscales, and a pixel unit which displays an output image corresponding to the output grayscales using pixels. In such an embodiment, the compensation value determiner determines weights based on display frequencies, display brightnesses, and the input grayscales, the compensation value determiner determines compensation values based on the display frequencies and positions of the pixels, and the compensation value determiner generates the final compensation values by applying the weights to the compensation values.

In an embodiment, the compensation value determiner may include a first weight lookup table in which weights based on a first display frequency, reference display brightnesses, and reference input grayscales are stored, and a second weight lookup table in which weights based on a second display frequency, the reference display brightnesses, and the reference input grayscales are stored, and the first display frequency may be different from the second display frequency.

In an embodiment, the compensation value determiner may further include a first compensation value lookup table in which compensation values based on the first display frequency and reference positions of the pixels are stored, and a second compensation value lookup table in which compensation values based on the second display frequency and the reference positions are stored.

In an embodiment, the compensation value determiner may further include a first multiplexer which receives an input display frequency, outputs weights included in the first weight lookup table as first weights when the input display frequency is equal to the first display frequency, and outputs weights included in the second weight lookup table as the first weights when the input display frequency is equal to the second display frequency.

In an embodiment, the compensation value determiner may further include a brightness compensator which receives an input display brightness, selects two of the reference display brightnesses for the input display brightness, each having a relatively small difference from the input display brightness, and generates second weights for the input display brightness by interpolating the first weights corresponding to the two of the reference display brightnesses selected for the input display brightness with respect to each of the reference input grayscales.

In an embodiment, the compensation value determiner may further include a grayscale compensator which receives input grayscales, selects two of the reference input grayscales for an input grayscale of the input grayscales, each having a relatively small difference from the input grayscale, and generates third weights for the input grayscales by interpolating the second weights corresponding to the two of the reference input grayscales selected for each of the input grayscales.

In an embodiment, the compensation value determiner may further include a second multiplexer which receives the input display frequency, outputs compensation values included in the first compensation value lookup table as first compensation values when the input display frequency is equal to the first display frequency, and outputs compensation values included in the second compensation value lookup table as the first compensation values when the input display frequency is equal to the second display frequency.

In an embodiment, the compensation value determiner may further include a position compensator which generates second compensation values for pixels which are not positioned at the reference positions by interpolating the first compensation values.

In an embodiment, the compensation value determiner may further include a final compensation value generator which generates the final compensation values by applying the third weights to the second compensation values.

In an embodiment, the final compensation value generator may generate the final compensation values by multiplying the third weights by the second compensation values, and the timing controller may generate the output grayscales by adding the final compensation values to the input grayscales.

According to an embodiment of the disclosure, a method of driving a display device may include generating final compensation values for an input image, generating output grayscales by applying the final compensation values to input grayscales for the input image, and displaying an output image corresponding to the output grayscales using pixels. In such an embodiment, the generating the final compensation values may include determining weights based on display frequencies, display brightnesses, and the input grayscales, determining compensation values based on the display frequencies and positions of the pixels, and generating the final compensation values by applying the weights to the compensation values.

In an embodiment, the display device may include a first weight lookup table in which weights based on a first display frequency, reference display brightnesses, and reference input grayscales are stored, and a second weight lookup table in which weights based on a second display frequency, the reference display brightnesses, and the reference input grayscales are stored, and the first display frequency may be different from the second display frequency.

In an embodiment, the display device may further include a first compensation value lookup table in which compensation values based on the first display frequency and reference positions of the pixels are stored, and a second compensation value lookup table in which compensation values based on the second display frequency and the reference positions are stored.

In an embodiment, the determining the weights may include outputting weights included in the first weight lookup table as first weights when an input display frequency is equal to the first display frequency, and outputting weights included the second weight lookup table as the first weights when the input display frequency is equal to the second display frequency.

In an embodiment, the determining the weights may further include selecting two of the reference display brightnesses for an input display brightness, each having a relatively small difference from the input display brightness, and generating second weights for the input display brightnesses by interpolating the first weights corresponding to the two of the reference display brightnesses selected for the input display brightness with respect to each of the reference input grayscales.

In an embodiment, the determining the weights may further include selecting two of the reference input grayscales for an input grayscale of the input grayscales, each having a relatively small difference from the input grayscale, and generating third weights for the input grayscales by interpolating the second weights of the two of the reference input grayscales selected for each of the input grayscales.

In an embodiment, the determining the compensation values may include outputting compensation values included in the first compensation value lookup table as first compensation values when the input display frequency is equal to the first display frequency, and outputting compensation values included in the second compensation value lookup table as the first compensation values when the input display frequency is equal to the second display frequency.

In an embodiment, the determining the compensation values may further include generating second compensation values for pixels which are not positioned at the reference positions by interpolating the first compensation values.

In an embodiment, in the generating the final compensation values, the final compensation values may be generated by applying the third weights to the second compensation values.

In an embodiment, the final compensation values may be generated by multiplying the third weights by the second compensation values, and the output grayscales may be generated by adding the final compensation values to the input grayscales.

According to an embodiment of the disclosure, an integrated circuit includes a first circuit unit which generates final compensation values for an input image, and a second circuit unit which receives input grayscales for the input image and generates output grayscales by applying the final compensation values to the input grayscales. In such an embodiment, the first circuit unit determines weights based on display frequencies, display brightnesses, and the input grayscales, the first circuit unit determines compensation values based on the display frequencies and positions of pixels, and the first circuit unit generates the final compensation values by applying the weights to the compensation values.

In an embodiment, the first circuit unit may include a first weight lookup table in which weights based on the first display frequency, reference display brightnesses, and reference input grayscales are stored, and a second weight lookup table in which weights based on a second display frequency, the reference display brightnesses, and the reference input grayscales are stored, and the first display frequency may be different from the second display frequency.

In an embodiment, the first circuit unit may further include a first compensation value lookup table in which compensation values based on the first display frequency and reference positions of the pixels are stored, and a second compensation value lookup table in which compensation values based on the second display frequency and the reference positions are stored.

In an embodiment, the first circuit unit may further include a first multiplexer which receives an input display frequency, outputs weights included in the first weight lookup table as first weights when the input display frequency is equal to the first display frequency, and outputs weights included in the second weight lookup table as the first weights when the input display frequency is equal to the second display frequency.

In an embodiment, the first circuit unit may further include a brightness compensator which receives an input display brightness, selects two of the reference display brightnesses for the input display brightness, each having a relatively small difference from the input display brightness, and generates second weights for the input display brightness by interpolating the first weights corresponding to the two of the reference display brightnesses selected for the input display brightness with respect to each of the reference input grayscales.

In an embodiment, the first circuit unit may further include a grayscale compensator which receives the input grayscales, selects two of the reference input grayscales for an input grayscale of the input grayscales, each having a relatively small difference from the input grayscale, and generates third weights for the input grayscales by interpolating the second weights corresponding to the two of the reference input grayscales selected for each of the input grayscales.

In an embodiment, the first circuit unit may further include a second multiplexer which receives the input display frequency, outputs compensation values included in the first compensation value lookup table as first compensation values when the input display frequency is equal to the first display frequency, and outputs compensation values included in the second compensation value lookup table as the first compensation values when the input display frequency is equal to the second display frequency.

In an embodiment, the first circuit unit may further include a position compensator which generates second compensation values for pixels which are not positioned at the reference positions by interpolating the first compensation values.

In an embodiment, the first circuit unit may further include a final compensation value generator which generates the final compensation values by applying the third weights to the second compensation values.

In an embodiment, the final compensation value generator may generate the final compensation values by multiplying the third weights by the second compensation values, and the second circuit unit may generate the output grayscales by adding the final compensation values to the input grayscales.

In an embodiment, the display device and the method of driving the same according to the disclosure may calculate appropriate image compensation values at a minimum cost with respect to various driving conditions.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
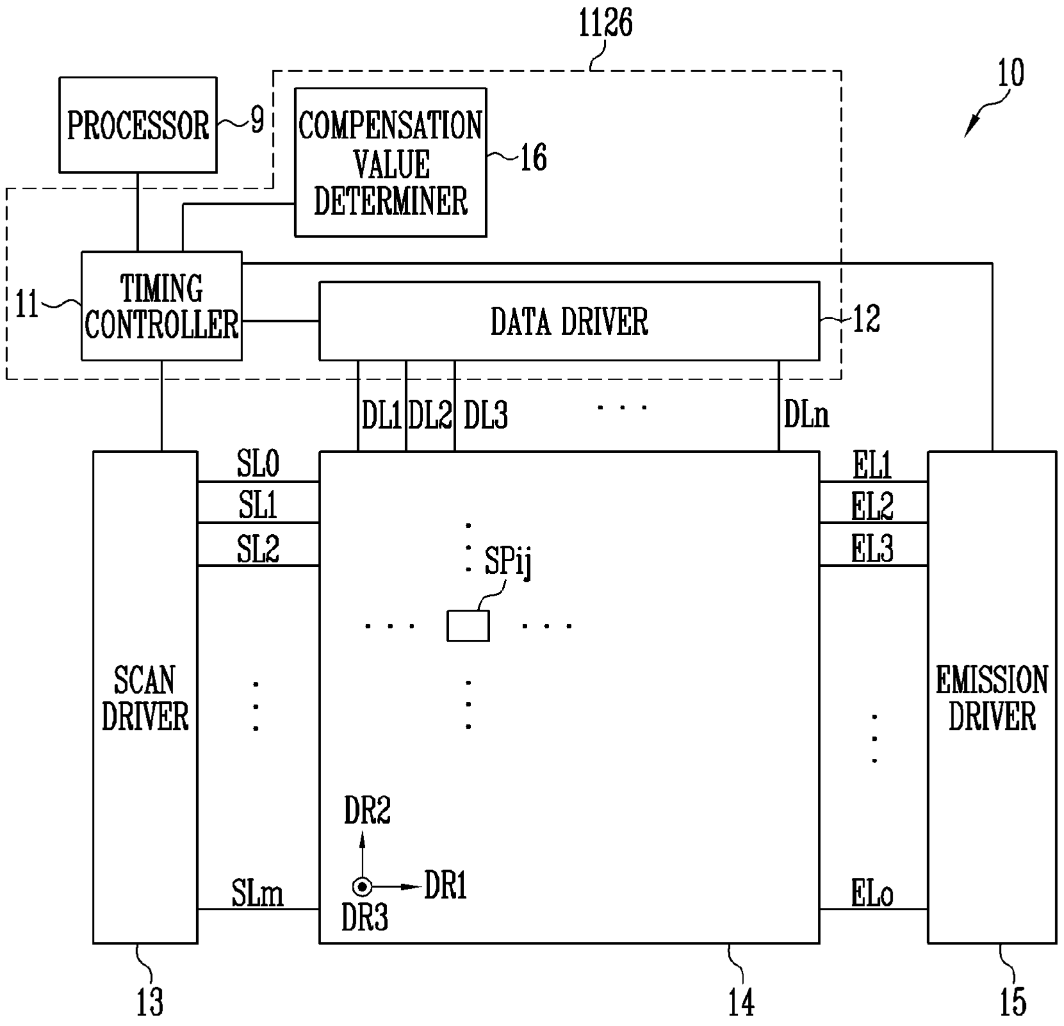
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a diagram illustrating a display device according to an embodiment of the disclosure.

Referring to FIG. 1, the display device 10 according to an embodiment of the disclosure may include a processor 9, a timing controller 11, a data driver 12, a scan driver 13, a pixel unit 14, an emission driver 15, and a compensation value determiner 16.

The processor 9 may provide input grayscales for an input image (or an image frame). The input grayscales may include a first color grayscale, a second color grayscale, and a third color grayscale with respect to each pixel. The first color grayscale may be a grayscale for expressing a first color, the second color grayscale may be a grayscale for expressing a second color, and the third color grayscale may be a grayscale for expressing a third color. The processor 9 may be an application processor, a central processing unit (CPU), a graphics processing unit (GPU), or the like.

In addition, the processor 9 may provide a control signal for the input image. Such a control signal may include a horizontal synchronization signal, a vertical synchronization signal, and a data enable signal. The vertical synchronization signal may include a plurality of pulses, and may indicate that a previous frame period is ended and a current frame period is started based on a time point at which each of pulses is generated. An interval between adjacent pulses of the vertical synchronization signal may correspond to one frame period. The horizontal synchronization signal may include a plurality of pulses, and may indicate that a previous horizontal period is ended and a new horizontal period is started based on a time point at which each of pulses is generated. An interval between adjacent pulses of the horizontal synchronization signal may correspond to one horizontal period. The data enable signal may have an enable level with respect to specific horizontal periods and a disable level in remaining periods. When the data enable signal is at the enable level, the data enable signal may indicate that color grayscales are supplied in corresponding horizontal periods.

The timing controller 11 may receive the input grayscales for the input image. In an embodiment, the timing controller 11 may be configured as an integral circuit with the compensation value determiner 16, that is, the timing controller 11 and the compensation value determiner 16 may be integrated into a single circuit. In such an embodiment, the compensation value determiner 16 may be referred to as a first circuit unit, and the timing controller 11 may be referred to as a second circuit unit. However, in the integrated circuit, the first circuit unit and the second circuit unit may not always be physically distinguished, and the first circuit unit and the second circuit unit may share some elements with each other. In an alternative embodiment, for example, the timing controller 11 and the compensation value determiner 16 may be configured as independent circuits, respectively. In such an embodiment, the timing controller 11 may provide the input grayscales and various control signals to the compensation value determiner 16.

In an embodiment, the compensation value determiner 16 may generate final compensation values for the input image. The compensation value determiner 16 may determine weights based on display frequencies, display brightnesses, and the input grayscales. In such an embodiment, the compensation value determiner 16 may determine compensation values based on the display frequencies and positions of pixels. In addition, the compensation value determiner 16 may generate the final compensation values by applying the weights to the compensation values.

The timing controller 11 may generate output grayscales by applying the final compensation values to the input grayscales. In an embodiment, for example, the timing controller 11 may generate the output grayscales by adding the final compensation values to the input grayscales.

The timing controller 11 may provide the output grayscales to the data driver 12. In addition, the timing controller 11 may provide a clock signal, a scan start signal, or the like to the scan driver 13. The timing controller 11 may provide a clock signal, an emission stop signal, or the like to the emission driver 15.

The data driver 12 may generate data voltages to be provided to data lines DL1, DL2, DL3, . . . , and DLn using the output grayscales and the control signals received from the timing controller 11. In an embodiment, for example, the data driver 12 may sample the output grayscales using the clock signal and apply the data voltages corresponding to the output grayscales to the data lines DL1 to DLn in a pixel row unit. Here, n may be an integer greater than 0. A pixel row refers to sub-pixels connected to a same scan lines and emission lines.

According to an embodiment, the timing controller 11, the data driver 12, and the compensation value determiner 16 may be configured as an integrated circuit 1126. In such an embodiment, the compensation value determiner 16 may be referred to as a first circuit unit, the timing controller 11 may be referred to as a second circuit unit, and the data driver 12 may be referred to as a third circuit unit. However, in the integrated circuit, the first circuit unit, the second circuit unit, and the third circuit unit may not always be physically distinguished, and the first circuit unit, the second circuit unit, and the third circuit unit may share some elements with each other.

The scan driver 13 may generate scan signals to be provided to scan lines SL0, SL1, SL2, . . . , and SLm by receiving the clock signal, the scan start signal, and the like from the timing controller 11. In an embodiment, for example, the scan driver 13 may sequentially provide scan signals having a turn-on level of pulse to the scan lines SL1 to SLm. In an embodiment, for example, the scan driver 13 may be configured in a form of a shift register, and may generate the scan signals in a method of sequentially transferring a scan start signal of a form of a turn-on level of pulse to a next stage circuit under control of the clock signal. Here, m may be an integer greater than 0.

The emission driver 15 may generate emission signals to be provided to emission lines EL1, EL2, EL3, . . . , and ELo by receiving the clock signal, the emission stop signal, and the like from the timing controller 11. In an embodiment, for example, the emission driver 15 may sequentially provide emission signals having a turn-off level of pulse to the emission lines EL1 to ELo. In an embodiment, for example, the emission driver 15 may be configured in a form of a shift register, and may generate emission signals in a method of sequentially transferring an emission stop signal in a form of a turn-off level of pulse to a next stage circuit under control of the clock signal. Here, o may be an integer greater than 0.

The pixel unit 14 includes sub-pixels. Each sub-pixel SPij may be connected to corresponding data line, scan line, and emission line. Here each of i and j may be an integer greater than 0. The sub-pixel SPij may refer to a sub-pixel in which a scan transistor is connected to an i-th scan line and a j-th data line.

The pixel unit 14 may include sub-pixels that emit light of the first color, sub-pixels that emit light of the second color, and sub-pixels that emit light of the third color. The first color, the second color, and the third color may be different colors. In an embodiment, for example, the first color may be one of red, green, and blue, the second color may be another of red, green, and blue, and the third color may be the other of red, green, and blue. In An alternative, magenta, cyan, and yellow may be used instead of red, green, and blue as the first to third colors. Hereinafter, for convenience of description, embodiments where the first color is red, the second color is green, and the third color is blue will be described in detail. The first sub-pixel, the second sub-pixel, and the third sub-pixel may configure one unit (or basic) pixel. However, according to a structure of the pixel unit 14, adjacent pixels may share one sub-pixel.

The pixel unit 14 may be disposed in various shapes such as diamond PENTILE™, RGB-Stripe, S-stripe, Real RGB, and normal PENTILE™.

In an embodiment, the sub-pixels of the pixel unit 14 are arranged in a first direction DR1 (shown in FIG. 8) and a second direction DR2 (shown in FIG. 8) perpendicular to the first direction DR1. In such an embodiment, it is an emission direction of the sub-pixels is a third direction DR3 (shown in FIG. 8) perpendicular to the first direction DR1 and the second direction DR2. Here, the third direction DR3 may be a thickness direction of the pixel unit 14.

Figure 2:
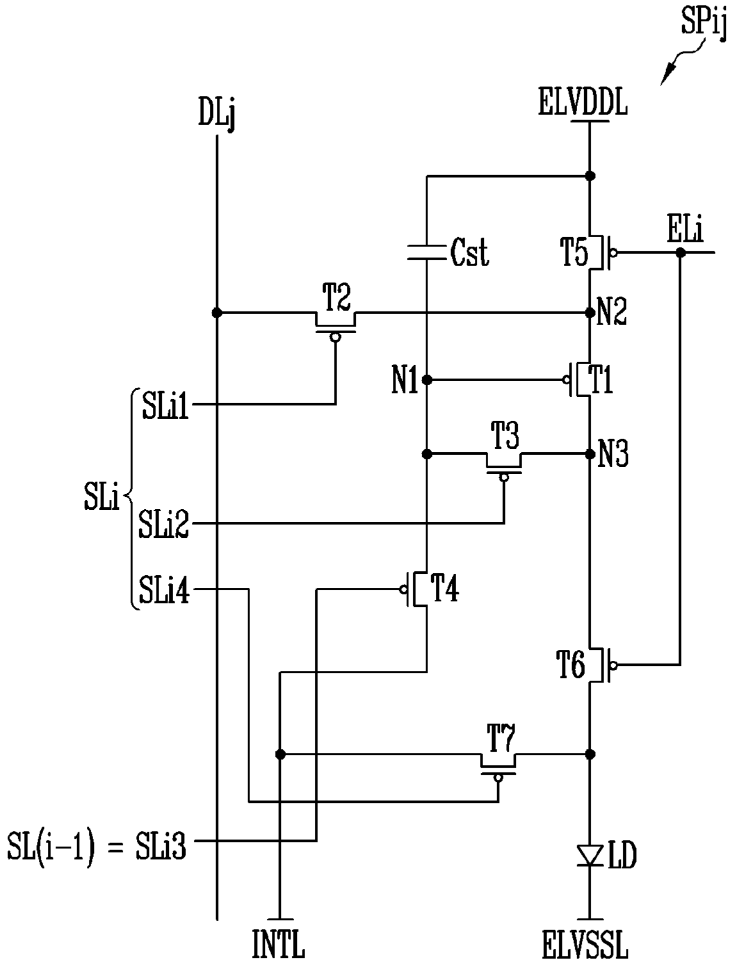
FIG. 2 is a diagram illustrating a sub-pixel according to an embodiment of the disclosure.

FIG. 2 is a diagram illustrating a sub-pixel according to an embodiment of the disclosure.

Referring to FIG. 2, an embodiment of a sub-pixel SPij includes transistors T1, T2, T3, T4, T5, T6, and T7, a storage capacitor Cst, and a light emitting element LD.

Hereinafter, an embodiment of a sub-pixel SPij having a circuit configured of a P-type transistor will be described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistors in which a current amount increases when a voltage difference between a gate electrode and a source electrode increases in a positive direction. The transistor may be configured in various forms such as a thin film transistor (TFT), a field effect transistor (FET), or a bipolar junction transistor (BJT).

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode connected to a scan line SLi1, a first electrode connected to a data line DLj, and a second electrode connected to the second node N2. The second transistor T2 may be referred to as a scan transistor.

The third transistor T3 may include a gate electrode connected to a scan line SLi2, a first electrode connected to the first node N1, and a second electrode connected to the third node N3. The third transistor T3 may be referred to as a diode connection transistor.

The fourth transistor T4 may include a gate electrode connected to a scan line SLi3, a first electrode connected to the first node N1, and a second electrode connected to an initialization line INTL. The fourth transistor T4 may be referred to as a gate initialization transistor.

The fifth transistor T5 may include a gate electrode connected to an i-th emission line ELi, a first electrode connected to a first power line ELVDDL, and a second electrode connected to the second node N2. The fifth transistor T5 may be referred to as an emission transistor. In another embodiment, the gate electrode of the fifth transistor T5 may be connected to an emission line different from an emission line connected to a gate electrode of the sixth transistor T6.

The sixth transistor T6 may include the gate electrode connected to the i-th emission line ELi, a first electrode connected to the third node N3, and a second electrode connected to an anode of the light emitting element LD. The sixth transistor T6 may be referred to as an emission transistor. In an alternative embodiment, the gate electrode of the sixth transistor T6 may be connected to an emission line different from the emission line connected to the gate electrode of the fifth transistor T5.

The seventh transistor T7 may include a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode), an inorganic light emitting element (inorganic light emitting diode), a quantum dot/well light emitting element (quantum dot/well light emitting diode), or the like. Although FIG. 2 shows an embodiment where each pixel includes a single light emitting element LD, a plurality of light emitting elements may be provided in each pixel in an alternative embodiment. In such an embodiment, the plurality of light emitting elements may be connected in series, parallel, series-parallel, or the like. The light emitting element LD of each sub-pixel SPij may emit light in one of the first color, the second color, and the third color.

The first power line ELVDDL may be supplied with a first power voltage, the second power line ELVSSL may be supplied with a second power voltage, and the initialization line INTL may be supplied with an initialization voltage. In an embodiment, for example, the first power voltage may be greater than the second power voltage. In an embodiment, for example, the initialization voltage may be equal to or greater than the second power voltage. In an embodiment, for example, the initialization voltage may correspond to a data voltage of the smallest size among data voltages corresponding to the output grayscales. In an alternative embodiment, for example, the size of the initialization voltage may be less than sizes of the data voltages corresponding to the color grayscales.

Figure 3:
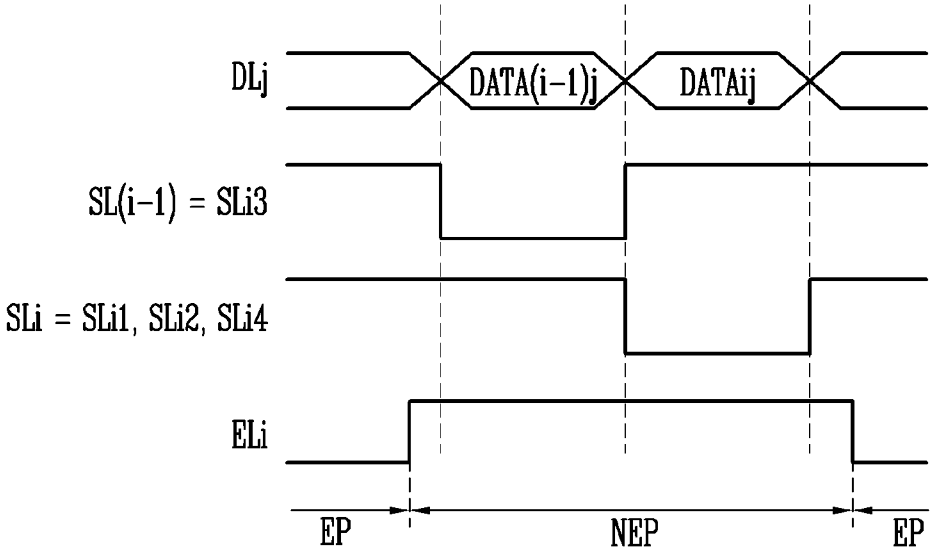
FIG. 3 is a diagram illustrating a method of driving the sub-pixel of FIG. 2.

FIG. 3 is a diagram illustrating a method of driving the sub-pixel of FIG. 2.

Hereinafter, for convenience of description, embodiments where the scan lines SLi1, SLi2, and SLi4 are i-th scan lines SLi and the scan line SLi3 is an (i−1)-th scan line SL(i−1) will be described in detail. However, a connection relationship of the scan lines SLi1, SLi2, SLi3, and SLi4 may be various according to embodiments. In an embodiment, for example, the scan line SLi4 may be the (i−1)-th scan line or an (i+1)-th scan line.

First, an emission signal of a turn-off level (logic high level) is applied to the i-th emission line ELi, a data voltage DATA(i−1)j for an (i−1)-th sub-pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor T2 is turned off, and the data voltage DATA(i−1)j for the (i−1)-th sub-pixel is prevented from being input to the i-th sub-pixel SPij.

At this time, since the fourth transistor T4 is turned on, the first node N1 is connected to the initialization line INTL, and thus a voltage of the first node N1 is initialized. Since the emission signal of the turn-off level is applied to the emission line ELi, the transistors T5 and T6 are turned off, and undesired light emission of the light emitting element LD by an initialization voltage application process is effectively prevented.

Next, a data voltage DATAij for the i-th sub-pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In an embodiment, where the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL is formed.

A driving current amount flowing to the first electrode and the second electrode of the first transistor T1 is adjusted based on the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is the turn-on level, sub-pixels receiving the corresponding emission signal may be in a display state. Therefore, a period in which the emission signal is the turn-on level may be referred to as an emission period EP (or an emission allowable period). In addition, when the emission signal is the turn-off level, sub-pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 3 is for preventing the sub-pixel SPij from emitting light with an undesired luminance during the initialization period and the data writing period.

One or more non-emission periods NEP may be additionally provided while data written to the sub-pixel SPij is maintained (for example, one frame period). This may be for effectively expressing a low grayscale by reducing the emission period EP of the sub-pixel SPij, or for smoothly blurring a motion of an image.

Figure 4:
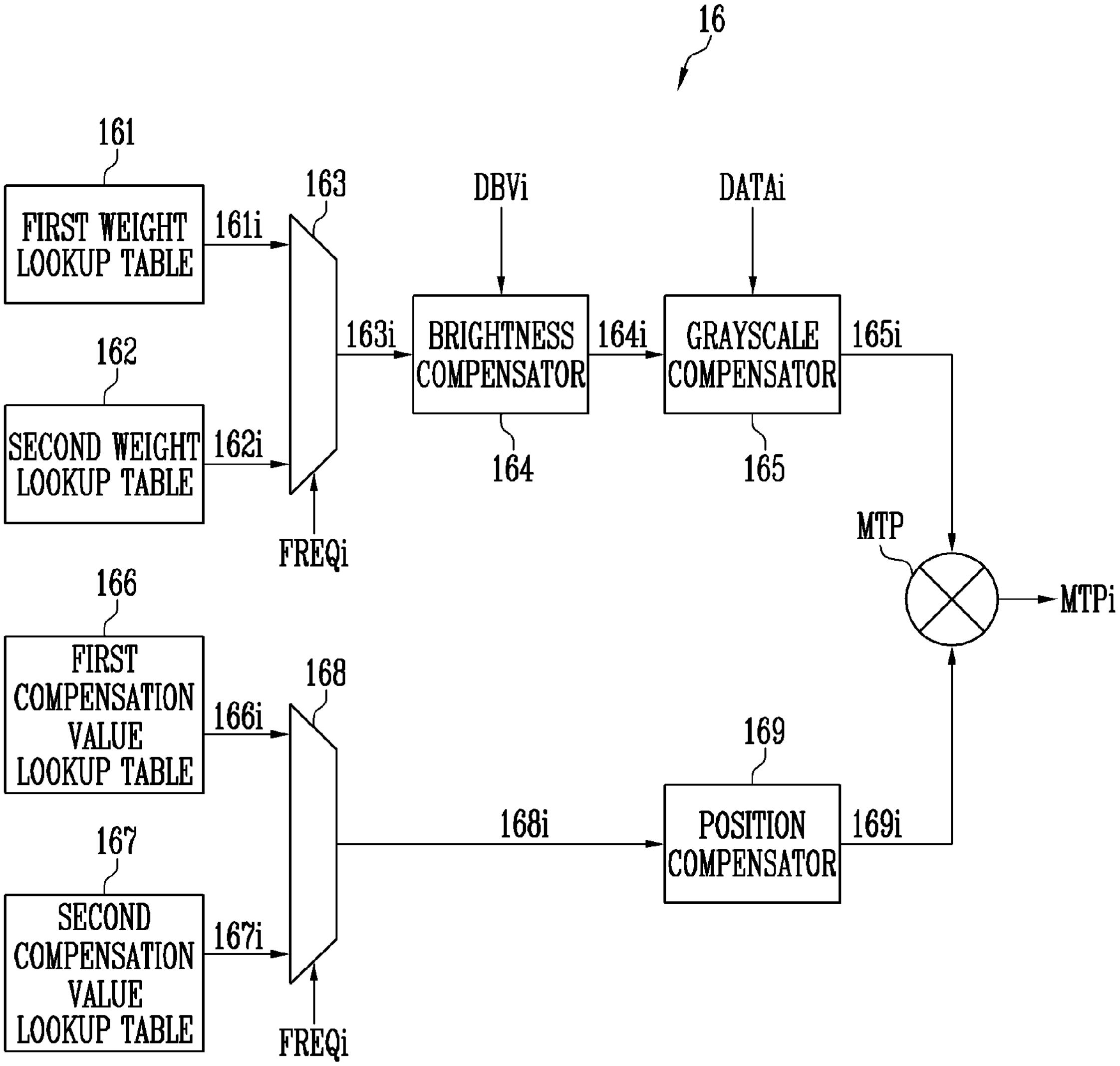
FIG. 4 is a diagram illustrating a compensation value determiner according to an embodiment of the disclosure.
Figure 5:
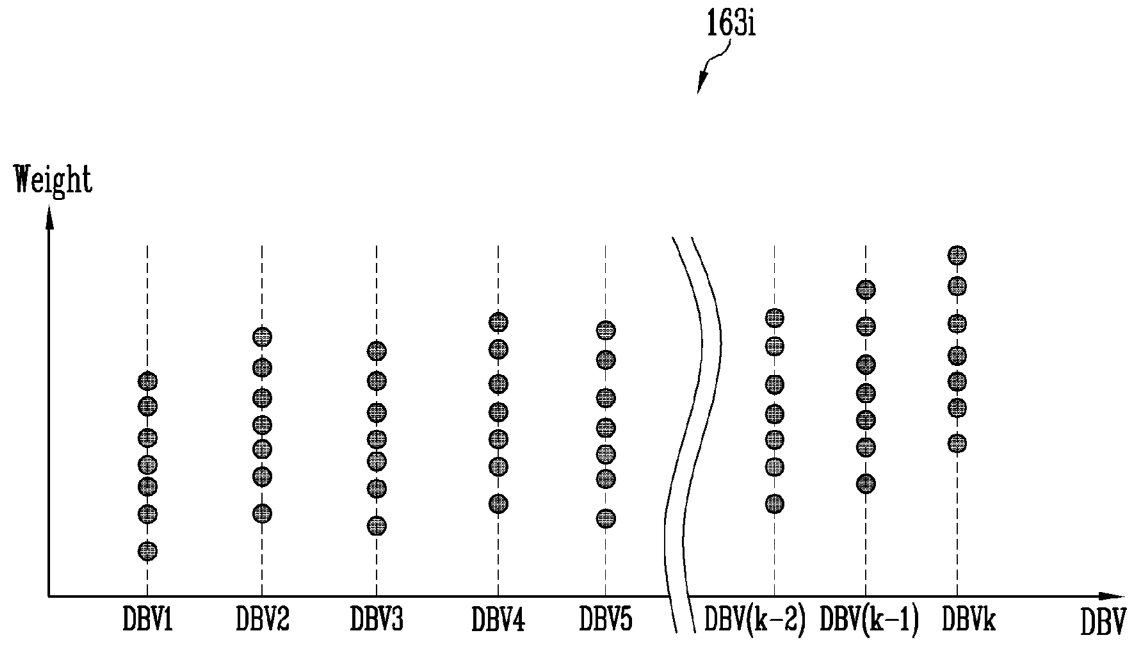
FIG. 5 is a diagram illustrating first weights according to an embodiment of the disclosure.
Figure 6:
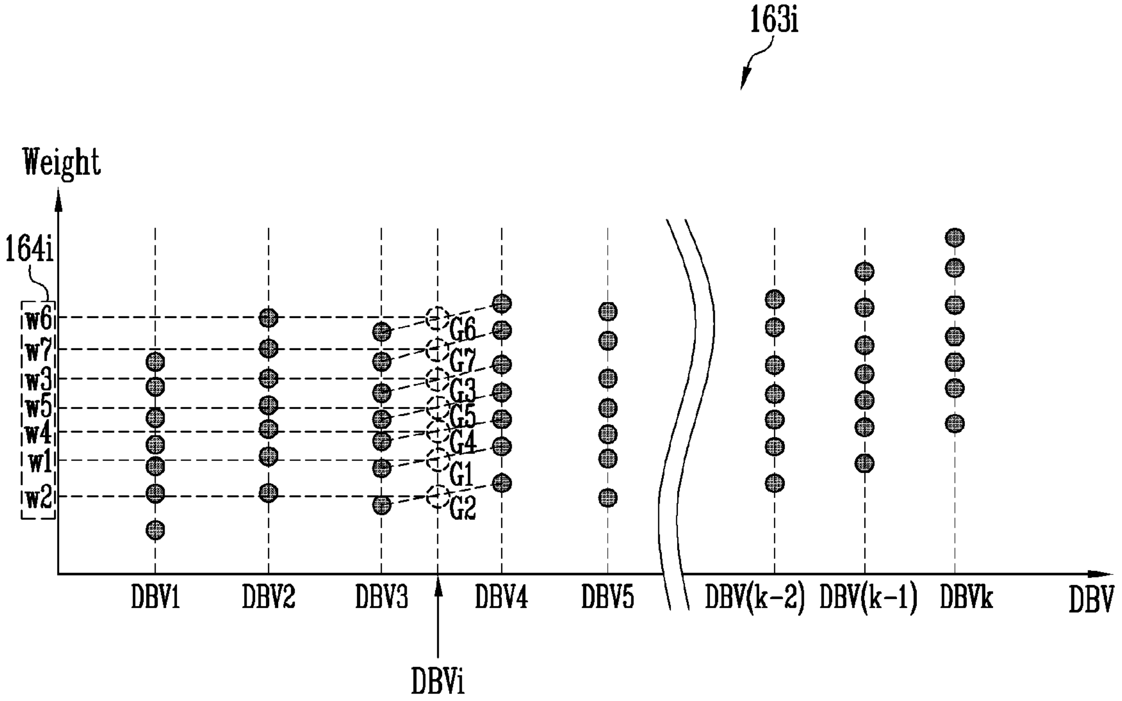
FIG. 6 is a diagram illustrating second weights according to an embodiment of the disclosure.
Figure 7:
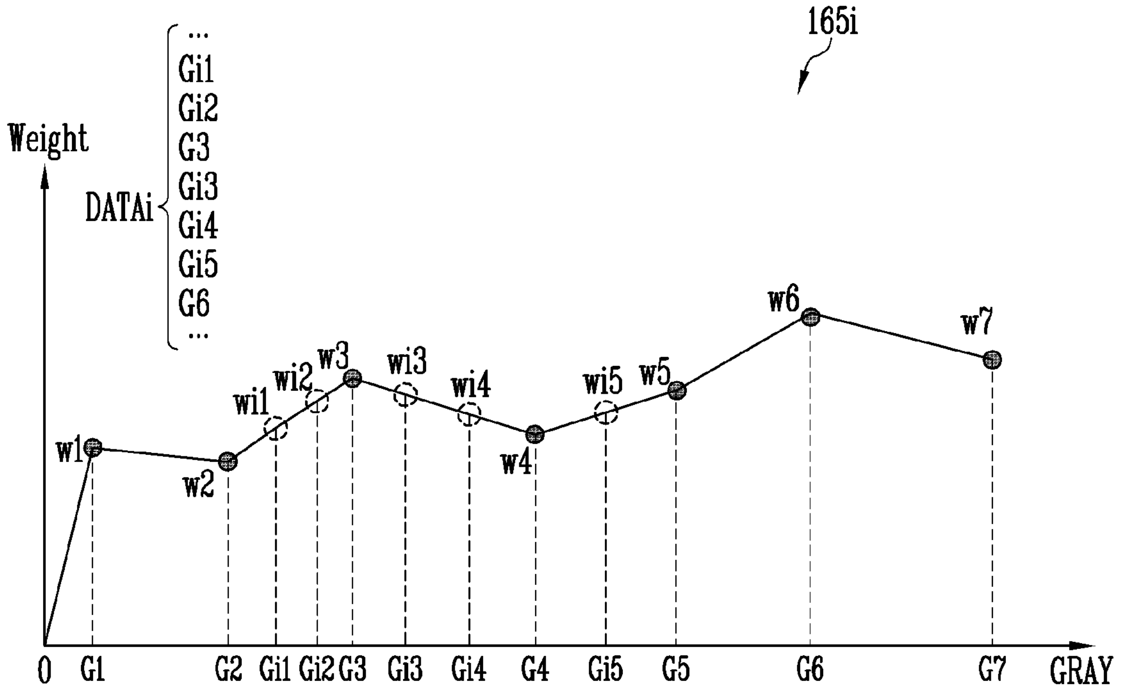
FIG. 7 is a diagram illustrating third weights according to an embodiment of the disclosure.
Figure 8:
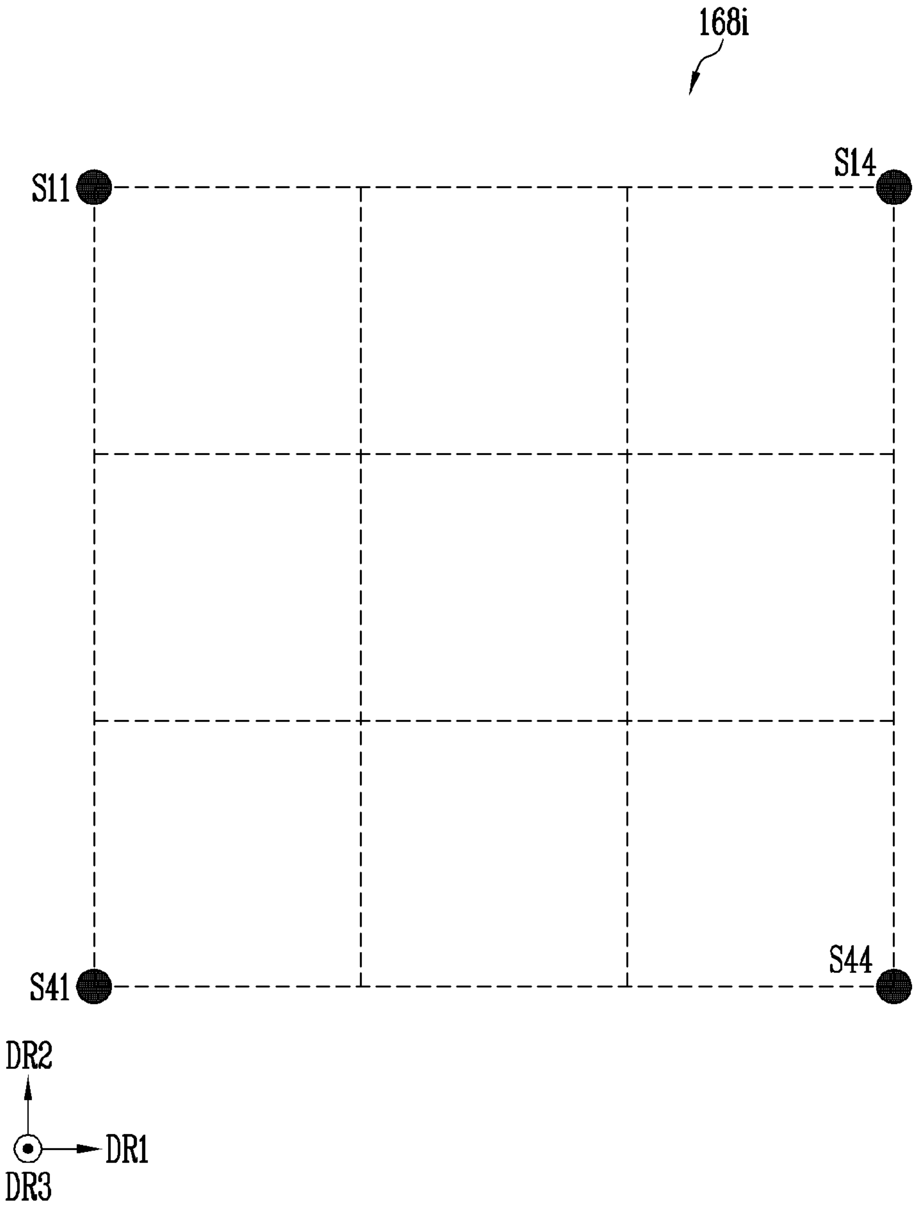
FIG. 8 is a diagram illustrating first compensation values according to an embodiment of the disclosure.
Figure 9:
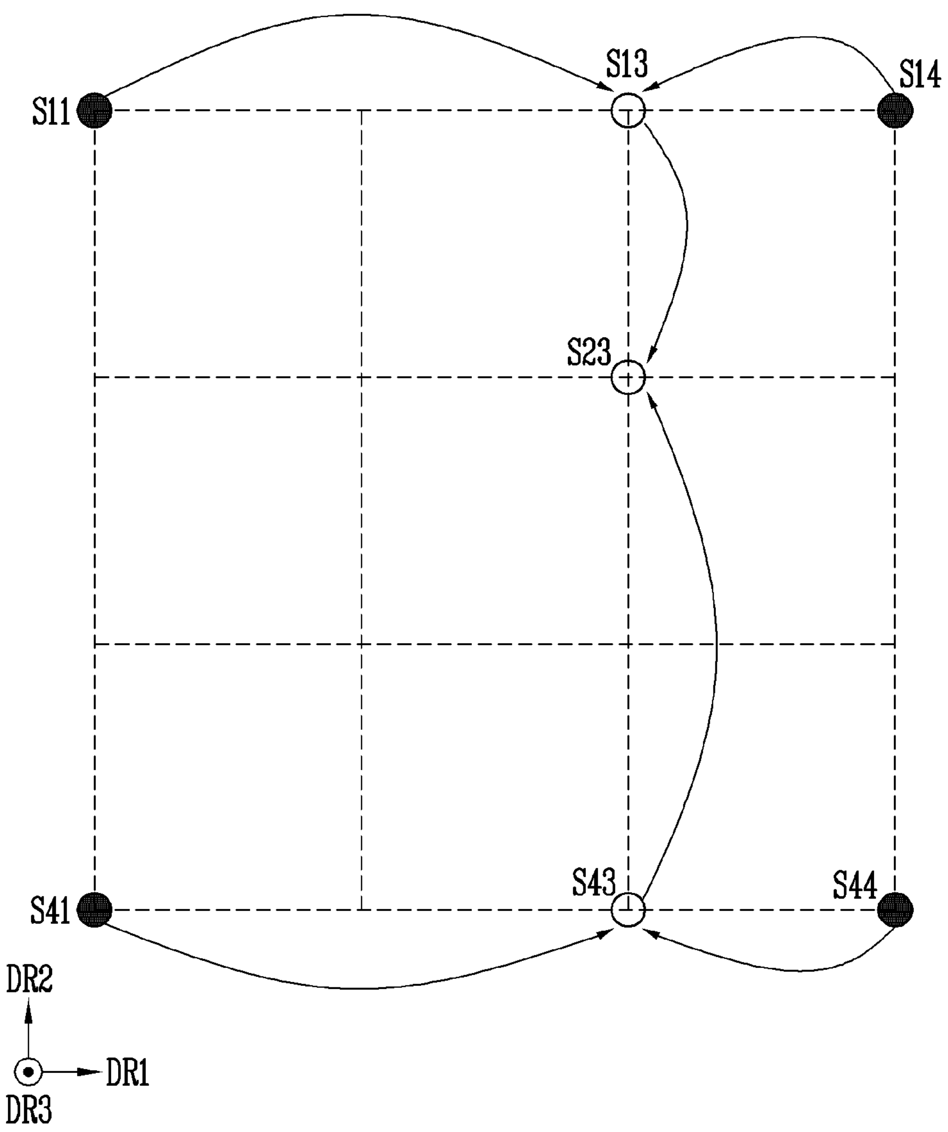
FIGS. 9 and 10 are diagrams illustrating second compensation values according to an embodiment of the disclosure.
Figure 10:
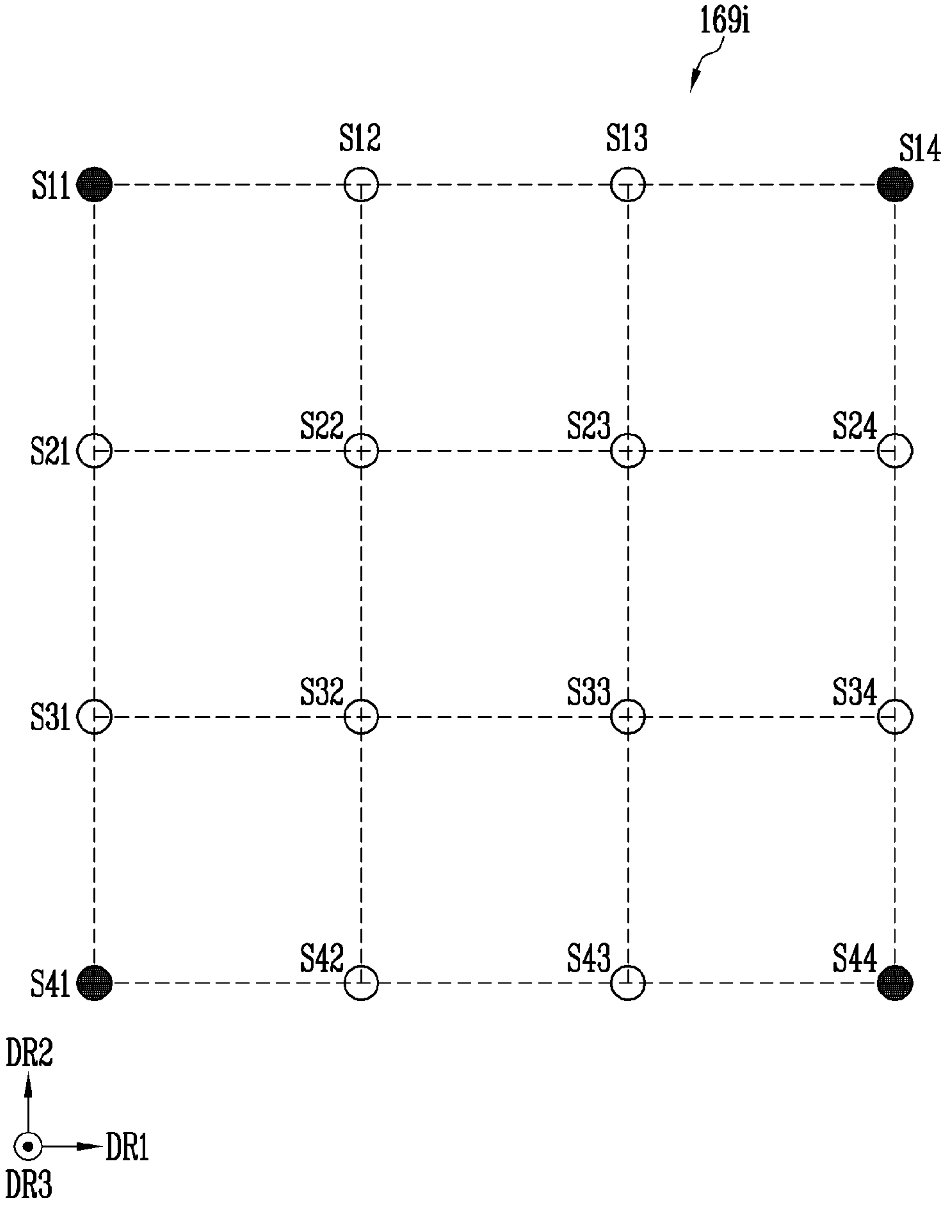

FIG. 4 is a diagram illustrating a compensation value determiner according to an embodiment of the disclosure. FIG. 5 is a diagram illustrating first weights according to an embodiment of the disclosure. FIG. 6 is a diagram illustrating second weights according to an embodiment of the disclosure. FIG. 7 is a diagram illustrating third weights according to an embodiment of the disclosure. FIG. 8 is a diagram illustrating first compensation values according to an embodiment of the disclosure. FIGS. 9 and 10 are diagrams illustrating second compensation values according to an embodiment of the disclosure.

Referring to FIG. 4, a compensation value determiner 16 according to an embodiment of the disclosure may include a first weight lookup table 161, a second weight lookup table 162, a first multiplexer 163, a brightness compensator 164, a grayscale compensator 165, a first compensation value lookup table 166, a second compensation value lookup table 167, a second multiplexer 168, a position compensator 169, and a final compensation value generator MTP.

Weights **161*i* based on a first display frequency, reference display brightnesses, and reference input grayscales may be stored in the first weight lookup table 161 in advance. Weights 162*i* based on a second display frequency, the reference display brightnesses, and the reference input grayscales may be stored in the second weight lookup table 162 in advance. The first weight lookup table 161 and the second weight lookup table 162 may mean some storage spaces of one memory device. In an embodiment, for example, the first weight lookup table 161 and the second weight lookup table 162** may be implemented as independent memory devices.

A display frequency may mean the number of image frames displayed per one second in the display device 10. The first display frequency may be different from the second display frequency. The first display frequency may be a frequency suitable for displaying a moving image. In an embodiment, for example, the first display frequency may be a high frequency of 60 hertz (Hz) or higher. The second display frequency may be a frequency suitable for displaying a still image. In an embodiment, for example, the second display frequency may be a low frequency of less than 60 Hz.

The reference display brightnesses may be a portion of a plurality of display brightnesses set in the display device 10. The display brightness may be manually set by a user's manipulation for the display device 10 or may be automatically set by an algorithm associated with an illuminance sensor or the like. A magnitude of the display brightness may limit a maximum luminance of light emitted from the pixels. In an embodiment, for example, the display brightness may be luminance information of light emitted from pixels set to a maximum grayscale. In an embodiment, for example, the display brightness may be the luminance of white light generated by all pixels of the pixel unit 14 emitting light corresponding to a white grayscale. A unit of a luminance may be nits. In an embodiment, for example, a maximum value of the plurality of display brightnesses may be 3000 nits, and a minimum value of the plurality of display brightnesses may be 4 nits. The maximum value and the minimum value of the plurality of display brightnesses may be set variously according to a product. Even though it is the same grayscale, since a data voltage varies according to the display brightness, a light emission luminance of the pixel also varies.

The reference input grayscales may be some of a plurality of input grayscales set in the display device 10. In an embodiment, for example, a minimum value of the plurality of input grayscales may be 0 and a maximum value may be 255. The maximum value and the minimum value of the plurality of input grayscales may be set variously according to a product.

According to an embodiment, only a partial portion of all weights for all display brightnesses and all input grayscales is used or stored, an increase of a tact time and an increase of a memory capacity may be effectively prevented.

The first multiplexer 163 may receive an input display frequency FREQi. The input display frequency FREQi may be a display frequency set with respect to a current input image. The first multiplexer 163 may output the weights 161*i* included in the first weight lookup table 161 as first weights 163*i* when the input display frequency FREQi is equal to a first display frequency. in an embodiment, the first multiplexer 163 may output the weights 162*i* included in the second weight lookup table 162 as the first weights 163*i* when the input display frequency FREQi is equal to a second weight lookup table 162.

Referring to FIG. 5, a graph of the first weights 163*i* is exemplarily shown. A horizontal axis of the graph represents a display brightness DBV and a vertical axis represents a weight. The first weights 163*i* may be weights corresponding to reference input grayscales (for example, 7 grayscales) in each of reference display brightnesses DBV1, DBV2, DBV3, DBV4, DBV5, . . . , DBV(k−2), DBV(k−1), and DBVk.

The brightness compensator 164 may receive an input display brightness DBVi. The input display brightness DBVi may be a display brightness currently set in the display device 10. Referring to FIG. 5, the brightness compensator 164 may select two reference display brightnesses DBV3 and DBV4 having a relatively small difference from a corresponding input display brightness, i.e., the input display brightness DBVi, compared to other reference display brightnesses DBV1, DBV2, DBV5, . . . , DBV(k−2), DBV(k−1), and DBVk. That is, the selected two reference display brightnesses DBV3 and DBV4 may have two smallest differences from the input display brightness DBVi among the reference display brightnesses DBV1, DBV2, DBV3, DBV4, DBV5, . . . , DBV(k−2), DBV(k−1), and DBVk. The selected reference display brightness DBV3 may be a reference display brightness having the smallest difference from the input display brightness DBVi among the reference display brightnesses DBV1 to DBV3 less than the input display brightness DBVi. The selected reference display brightness DBV4 may be a reference display brightness having the smallest difference from the input display brightness DBVi among the reference display brightnesses DBV4 to DBVk greater than the input display brightness DBVi.

The brightness compensator 164 may generate second weights 164*i* for the input display brightness DBVi by interpolating (for example, linearly interpolating) the first weights 163*i* corresponding to the selected two reference display brightnesses DBV3 and DBV4, with respect to each of the reference input grayscales G1, G2, G3, G4, G5, G6, and G7. The second weights 164*i* may include weights w1, w2, w3, w4, w5, w6, and w7 corresponding to respective reference input grayscales G1, G2, G3, G4, G5, G6, and G7, respectively.

The grayscale compensator 165 may receive input grayscales DATAi. The grayscale compensator 165 may generate third weights 165*i* for the input grayscales DATAi by selecting two reference input grayscales, each having a relatively small difference from the input grayscale, with respect to each of the input grayscales . . . , Gi1, Gi2, G3, Gi3, Gi4, Gi5, G6, and . . . and interpolating (for example, linearly interpolating) the second weights of the selected two reference input grayscales.

Hereinafter, a process of operating the grayscale compensator 165 with respect to the input grayscale Gi1 will be described as an example. One G2 of selected reference input grayscales G2 and G3 may be the reference input grayscale G2 having the smallest difference from a corresponding input grayscale G1 among the reference input grayscales G1 and G2 lower than the corresponding input grayscale Gi1. The other one G3 of the selected reference input grayscales G2 and G3 may be the reference input grayscale G3 having the smallest difference from the corresponding input grayscale Gi1 among the reference input grayscales G3, G4, G5, G6, and G7 higher than the corresponding input grayscale Gi1. The grayscale compensator 165 may generate a third weight w1 for the input grayscale Gi1 by interpolating (for example, linearly interpolating) second weights w2 and w3 of the selected two reference input grayscales G2 and G3. Similarly, the grayscale compensator 165 may generate third weights . . . , wi2, wi3, wi4, wi5, and . . . for input grayscales . . . , Gi2, Gi3, Gi4, Gi5, and . . . . Second weights w3 and w6 may be used as third weights w3 and w6 with respect to input grayscales . . . , G3, G6, and . . . equal to the reference input grayscales among the input grayscales DATAi.

Compensation values 166*i* based on the first display frequency and reference positions of the pixels may be stored in the first compensation value lookup table 166 in advance. Compensation values 167*i* based on the second display frequency and the reference positions may be stored in the second compensation value lookup table 167 in advance. The first compensation value lookup table 166 and the second compensation value lookup table 167 may mean some storage spaces of one memory device. In an embodiment, the first compensation value lookup table 166 and the second compensation value lookup table 167 may be implemented as independent memory devices.

According to an embodiment, only a partial portion of all weights for all positions of the pixels is used or stored, an increase of a tact time and an increase of a memory capacity may be prevented.

The second multiplexer 168 may receive the input display frequency FREQi. When the input display frequency FREQi is equal to the first display frequency, the second multiplexer 168 may output the compensation values 166*i* included in the first compensation value lookup table 166 as first compensation values 168*i*. In an embodiment, when the input display frequency FREQi is equal to the second display frequency, the second multiplexer 168 may output the compensation values 167*i* included in the second compensation value lookup table 167 as the first compensation values 168*i*.

Referring to FIG. 8, for ease of understanding, the first compensation values 168*i* are shown based on the first direction DR1 and the second direction DR2, which are the same as a disposition directions of the pixels. As described above, the first compensation values 168*i* may include only first compensation values . . . , S11, S14, S41, S44, and . . . for the reference positions instead of positions of all pixels.

The position compensator 169 may generate second compensation values 169*i* for pixels which are not positioned at the reference positions by interpolating (for example, bilinearly interpolating) the first compensation values 168*i*. In an embodiment, for example, referring to FIG. 9, the position compensator 169 may generate a second compensation value S13 by interpolating a first compensation value S11 and a first compensation value S14 positioned in the first direction DR1 of the first compensation value S11. In such an embodiment, the position compensator 169 may generate a second compensation value S43 by interpolating a first compensation value S41 and a first compensation value S44 positioned in the first direction DR1 of the first compensation value S41. Next, the position compensator 169 may generate a second compensation value S13 by interpolating the second compensation value S43 and the second compensation value S13 positioned in the second direction DR2 of the second compensation value S43. By repeating such a process, the position compensator 169 may calculate second compensation values . . . , S12, S13, S21, S22, S23, S24, S31, S32, S33, S34, S42, S43, and . . . for the pixels which are not positioned at the reference positions (refer to FIG. 10). In such an embodiment, the position compensator 169 may use the first compensation values . . . , S11, S14, S41, S44, and . . . for the reference positions as the second compensation values . . . , S11, S14, S41, S44, and . . . for the reference positions.

The final compensation value generator MTP may generate final compensation values MTPi by applying the third weights 165*i* to the second compensation values 169*i*. In an embodiment, for example, the final compensation value generator MTP may generate the final compensation values MTPi by multiplying the third weights 165*i* by the second compensation values 169*i*. The timing controller 11 may generate the output grayscales by adding the final compensation values MTPi to the input grayscales DATAi (refer to FIG. 1).

Therefore, according to an embodiment, appropriate image compensation values may be calculated using a minimum memory capacity, with respect to positions of all pixels, all display brightnesses, and all input grayscales.

Figure 11:
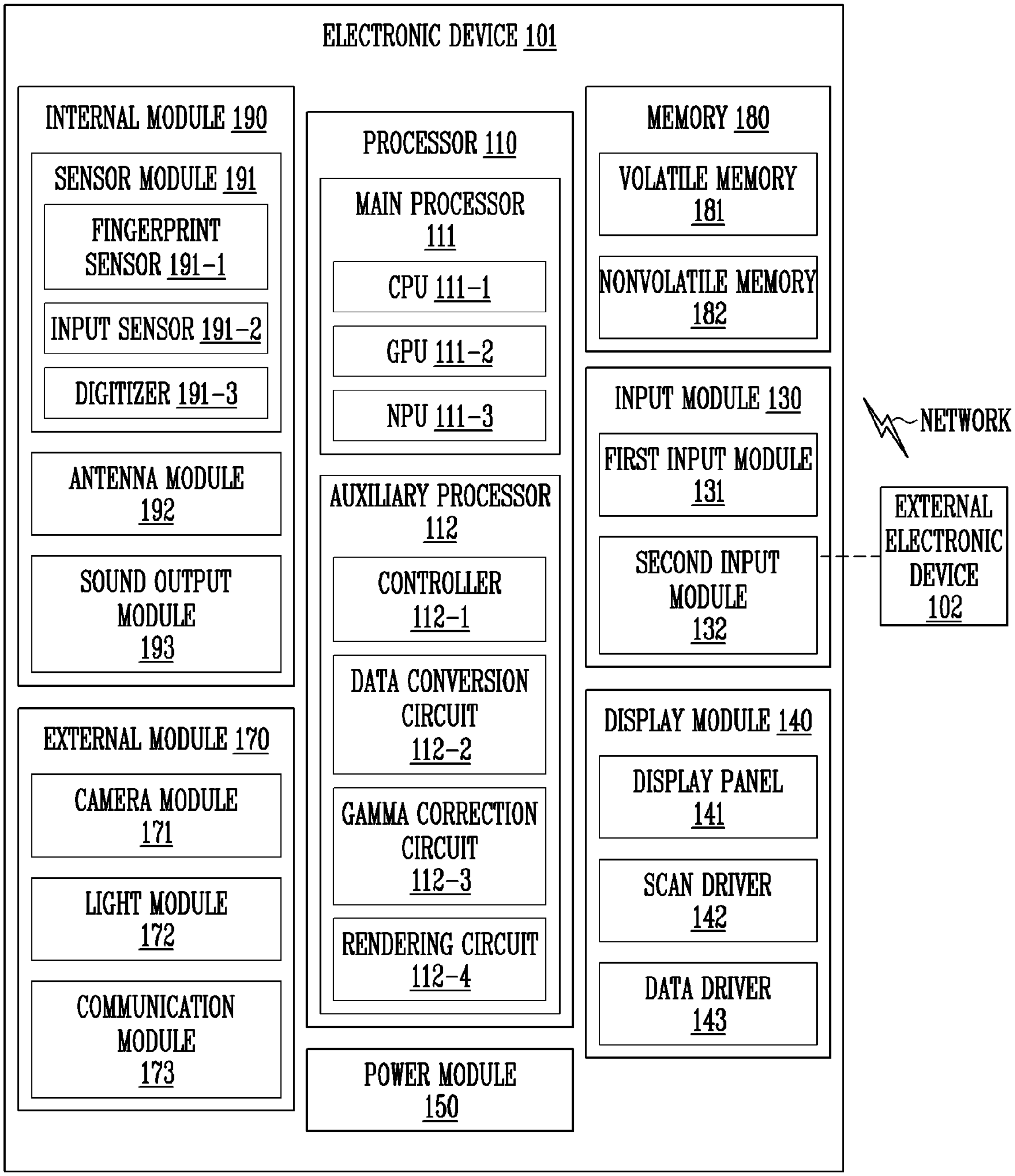
FIG. 11 is a block diagram of an electronic device according to embodiments of the disclosure.

FIG. 11 is a block diagram of an electronic device according to embodiments of the disclosure.

The electronic device 101 outputs various pieces of information through a display module 140 in an operating system. When a processor 110 executes an application stored in a memory 180, the display module 140 provides application information to a user through a display panel 141.

The processor 110 obtains an external input through an input module 130 or a sensor module 191 and executes an application corresponding to the external input. In an embodiment, for example, when the user selects a camera icon displayed on the display panel 141, the processor 110 obtains a user input through an input sensor 191-2 and activates a camera module 171. The processor 110 transmits image data corresponding to a captured image obtained through the camera module 171 to the display module 140. The display module 140 may display an image corresponding to the captured image through the display panel 141.

In an embodiment, for example, when personal information authentication is executed in the display module 140, a fingerprint sensor 191-1 obtains input fingerprint information as input data. The processor 110 compares input data obtained through the fingerprint sensor 191-1 with authentication data stored in the memory 180 and executes an application according to a comparison result. The display module 140 may display information executed according to a logic of the application through the display panel 141.

In an embodiment, for example, when a music streaming icon displayed on the display module 140 is selected, the processor 110 obtains a user input through the input sensor 191-2 and activates a music streaming application stored in the memory 180. When a music execution command is input in the music streaming application, the processor 110 activates a sound output module 193 to provide sound information corresponding to the music execution command to the user.

In the above, an operation of the electronic device 101 is briefly described. Hereinafter, a configuration of the electronic device 101 will be described in detail. Some of configurations of the electronic device 101 to be described later may be integrated and provided as one configuration, and one configuration may be separated into two or more configurations and provided.

Referring to FIG. 11, the electronic device 101 may communicate with an external electronic device 102 through a network (for example, a short-range wireless communication network or a long-range wireless communication network). According to an embodiment, the electronic device 101 may include the processor 110, the memory 180, the input module 130, the display module 140, a power module 150, an internal module 190, and an external module 170. According to an embodiment, in the electronic device 101, at least one selected from the above-described components may be omitted or one or more other components may be added. According to an embodiment, some of the above-described components (for example, the sensor module 191, an antenna module 192, or the sound output module 193) may be integrated into another component (for example, the display module 140).

The processor 110 may execute software to control at least another component (for example, a hardware or software component) of the electronic device 101 connected to the processor 110, and perform various data processing or operations. According to an embodiment, as at least a portion of the data processing or operation, the processor 110 may store a command or data received from another component (for example, the input module 130, the sensor module 191, or a communication module 173) in a volatile memory 181 and process the command or the data stored in the volatile memory 181, and result data may be stored in a nonvolatile memory 182.

The processor 110 may include a main processor 111 and an auxiliary processor 112. The main processor 111 may include one or more of a central processing unit (CPU) 111-1 or an application processor (AP). The main processor 111 may further include any one or more of a graphic processing unit (GPU) 111-2, a communication processor (CP), and an image signal processor (ISP). The main processor 111 may further include a neural processing unit (NPU) 111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two selected from the above-described processing units and processors may be implemented as one integrated configuration (for example, a single chip), or each may be implemented as an independent configuration (for example, a plurality of chips).

The auxiliary processor 112 may include a controller 112-1. The controller 112-1 may include an interface conversion circuit and a timing control circuit. The controller 112-1 receives an image signal from the main processor 111, converts a data format of the image signal to correspond to an interface specification with the display module 140, and outputs image data. The controller 112-1 may output various control signals necessary for driving the display module 140.

The auxiliary processor 112 may further include a data conversion circuit 112-2, a gamma correction circuit 112-3, a rendering circuit 112-4, or the like. The data conversion circuit 112-2 may receive the image data from the controller 112-1, compensate the image data to display an image with a desired luminance according to a characteristic of the electronic device 101, a setting of the user, or the like, or convert the image data for reduction of power consumption, afterimage compensation, or the like. The gamma correction circuit 112-3 may convert the image data, a gamma reference voltage, or the like so that the image displayed on the electronic device 101 has a desired gamma characteristic. The rendering circuit 112-4 may receive the image data from the controller 112-1 and render the image data in consideration of a pixel disposition or the like of the display panel 141 applied to the electronic device 101. At least one selected from the data conversion circuit 112-2, the gamma correction circuit 112-3, and the rendering circuit 112-4 may be integrated into another component (for example, the main processor 111 or the controller 112-1). At least one selected from the data conversion circuit 112-2, the gamma correction circuit 112-3, and the rendering circuit 112-4 may be integrated into a data driver 143 to be described later.

The memory 180 may store various data used by at least one component (for example, the processor 110 or the sensor module 191) of the electronic device 101, and input data or output data for a command related thereto. The memory 180 may include at least one of the volatile memory 181 and the nonvolatile memory 182.

The input module 130 may receive a command or data to be used by a component (for example, the processor 110, the sensor module 191, or the sound output module 193) of the electronic device 101 from an outside (for example, the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (for example, a button), or a pen (for example, a passive pen or an active pen). The second input module 132 may support a designated protocol capable of connecting to the external electronic device 102 by wire or wirelessly. According to an embodiment, the second input module 132 may include a high definition multimedia interface (HDMI), a universal serial bus (USB) interface, an SD card interface, or an audio interface. The second input module 132 may include a connector capable of physically connecting to the external electronic device 102, for example, an HDMI connector, a USB connector, an SD card connector, or an audio connector (for example, a headphone connector).

The display module 140 visually provides information to the user. The display module 140 may include the display panel 141, a scan driver 142, and the data driver 143. The display module 140 may further include a window, a chassis, and a bracket for protecting the display panel 141.

The display panel 141 may include a liquid crystal display panel, an organic light emitting display panel, or an inorganic light emitting display panel, and a type of the display panel 141 is not particularly limited. The display panel 141 may be a rigid type or a flexible type that may be rolled or folded. The display module 140 may further include a supporter, a bracket, a heat dissipation member, or the like that supports the display panel 141.

The scan driver 142 may be mounted on the display panel 141 as a driving chip. In addition, the scan driver 142 may be integrated in the display panel 141. In an embodiment, for example, the scan driver 142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 141. The scan driver 142 receives a control signal from the controller 112-1 and outputs the scan signals to the display panel 141 in response to the control signal.

The display panel 141 may further include an emission driver. The emission driver outputs an emission control signal to the display panel 141 in response to the control signal received from the controller 112-1. The emission driver may be formed separately from the scan driver 142 or integrated into the scan driver 142.

The data driver 143 receives the control signal from the controller 112-1, converts image data into an analog voltage (for example, a data voltage) in response to the control signal, and then outputs the data voltages to the display panel 141.

The data driver 143 may be integrated into another component (for example, the controller 112-1). A function of the interface conversion circuit and the timing control circuit of the controller 112-1 described above may be integrated into the data driver 143.

The display module 140 may further include the emission driver, a voltage generation circuit, or the like. The voltage generation circuit may output various voltages necessary for driving the display panel 141.

The power module 150 supplies power to a component of the electronic device 101. The power module 150 may include a battery that charges a power voltage. The battery may include a non-rechargeable primary cell, and a rechargeable secondary cell or fuel cell. The power module 150 may include a power management integrated circuit (PMIC). The PMIC supplies optimized power to each of the above-described module and a module to be described later. The power module 150 may include a wireless power transmission/reception member electrically connected to the battery. The wireless power transmission/reception member may include a plurality of antenna radiators of a coil form.

The electronic device 101 may further include the internal module 190 and the external module 170. The internal module 190 may include the sensor module 191, the antenna module 192, and the sound output module 193. The external module 170 may include the camera module 171, a light module 172, and the communication module 173.

The sensor module 191 may sense an input by a body of the user or an input by a pen among the first input module 131, and may generate an electrical signal or a data value corresponding to the input. The sensor module 191 may include at least one selected from the fingerprint sensor 191-1, the input sensor 191-2, and a digitizer 191-3.

The fingerprint sensor 191-1 may generate a data value corresponding to a fingerprint of the user. The fingerprint sensor 191-1 may include an optical type fingerprint sensor or a capacitive type fingerprint sensor.

The input sensor 191-2 may generate a data value corresponding to coordinate information of the input by the body of the user or the pen. The input sensor 191-2 generates a capacitance change amount by the input as the data value. The input sensor 191-2 may sense an input by the passive pen or may transmit/receive data to and from the active pen.

The input sensor 191-2 may measure a biometric signal such as blood pressure, water, or body fat. In an embodiment, for example, when the user touches a sensor layer or a sensing panel with a body part and does not move during a certain time, the input sensor 191-2 may sense the biometric signal based on a change of an electric field by the body part and output information desired by the user to the display module 140.

The digitizer 191-3 may generate a data value corresponding to coordinate information input by a pen. The digitizer 191-3 generates an electromagnetic change amount by an input as the data value. The digitizer 191-3 may sense an input by a passive pen or transmit or receive data to or from the active pen.

At least one of the fingerprint sensor 191-1, the input sensor 191-2, and the digitizer 191-3 may be implemented as a sensor layer formed on the display panel 141 through a successive process. The fingerprint sensor 191-1, the input sensor 191-2, and the digitizer 191-3 may be disposed on the display panel 141, and any one of the fingerprint sensor 191-1, the input sensor 191-3, and the digitizer 191-3, for example, the digitizer 191-3 may be disposed under the display panel 141.

At least two selected from the fingerprint sensor 191-1, the input sensor 191-2, and the digitizer 191-3 may be formed to be integrated into one sensing panel through the same process. When at least two selected from the fingerprint sensor 191-1, the photo sensor 1161-2, and the input sensor 191-2 are integrated into one sensing panel, the sensing panel may be disposed between the display panel 141 and a window disposed above the display panel 141. According to an embodiment, the sensing panel may be disposed on the window, and a position of the sensing panel is not particularly limited.

At least one selected from the fingerprint sensor 191-1, the input sensor 191-2, and the digitizer 191-3 may be embedded in the display panel 141. That is, at least one selected from the fingerprint sensor 191-1, the input sensor 191-2, and the digitizer 191-3 may be simultaneously formed through a process of forming elements (for example, a light emitting element, a transistor, and the like) included in the display panel 141.

In addition, the sensor module 191 may generate an electrical signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 192 may include one or more antennas for transmitting a signal or power to an outside or receiving a signal or power from an outside. According to an embodiment, the communication module 173 may transmit a signal to an external electronic device or receive a signal from an external electronic device through an antenna suitable for a communication method. An antenna pattern of the antenna module 192 may be integrated into one configuration (for example, the display panel 141) of the display module 140 or the input sensor 191-2.

The sound output module 193 is a device for outputting a sound signal to an outside of the electronic device 101, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 193 may be integrated into the display module 140.

The camera module 171 may capture a still image and a moving image. According to an embodiment, the camera module 171 may include one or more lenses, an image sensor, or an image signal processor. The camera module 171 may further include an infrared camera capable of measuring presence or absence of the user, a position of the user, a gaze of the user, and the like.

The light module 172 may provide light. The light module 172 may include a light emitting diode or a xenon lamp. The light module 172 may operate in conjunction with the camera module 171 or may operate independently.

The communication module 173 may support establishment of a wired or wireless communication channel between the electronic device 101 and the external electronic device 102 and communication performance through the established communication channel. The communication module 173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 173 may communicate with the external electronic device 102 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 130, the sensor module 191, the camera module 171, or the like may be used to control an operation of the display module 140 in conjunction with the processor 110.

The processor 110 outputs a command or data to the display module 140, the sound output module 193, the camera module 171, or the light module 172 based on input data received from the input module 130. In an embodiment, for example, the processor 110 may generate image data in response to the input data applied through a mouse, an active pen, or the like and output the image data to the display module 140, or generate command data in response to the input data and output the command data to the camera module 171 or the light module 172. When the input data is not received from the input module 130 during a certain time, the processor 110 may convert an operation mode of the electronic device 101 to a low power mode or a sleep mode to reduce power consumed in the electronic device 101.

The processor 110 outputs a command or data to the display module 140, the sound output module 193, the camera module 171, or the light module 172 based on sensing data received from the sensor module 191. In an embodiment, for example, the processor 110 may compare authentication data applied by the fingerprint sensor 191-1 with authentication data stored in the memory 180 and then execute an application according to a comparison result. The processor 110 may execute the command based on sensing data sensed by the input sensor 191-2 or the digitizer 191-3, or output corresponding image data to the display module 140. In an embodiment where the sensor module 191 includes a temperature sensor, the processor 110 may receive temperature data for a measured temperature from the sensor module 191 and further perform luminance correction or the like on the image data based on the temperature data.

The processor 110 may receive measurement data for the presence of the user, the position of the user, the gaze of the user, and the like, from the camera module 171. The processor 110 may further perform luminance correction or the like on the image data based on the measurement data. In an embodiment, for example, the processor 110 determining the presence or absence of the user through an input from the camera module 171 may output image data of which a luminance is corrected through the data conversion circuit 112-2 or the gamma correction circuit 112-3 to the display module 140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 110 may communicate with the display module 140 through a mutually agreed interface, for example, may use any one of the above-described communication methods, and is not limited to the above-described communication method.

The electronic device 101 according to embodiments in the disclosure may be various types of devices. The electronic device 101 may include, for example, at least one of a portable communication device (for example, a smart phone), a computer device, a portable multimedia device, a portable medical device, a camera, a wearable device, or a home appliance. The electronic device 101 according to an embodiment of this document is not limited to the above-described devices.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a compensation value determiner which generates final compensation values for an input image;

a timing controller which receives input grayscales of the input image and generates output grayscales by applying the final compensation values to the input grayscales; and a pixel unit which displays an output image corresponding to the output grayscales using pixels, wherein the compensation value determiner determines weights based on display frequencies, display brightnesses, and the input grayscales, the compensation value determiner determines compensation values based on the display frequencies and positions of the pixels, and the compensation value determiner generates the final compensation values by applying the weights to the compensation values.

2. The display device according to claim 1, wherein the compensation value determiner comprises:

a first weight lookup table in which weights based on a first display frequency, reference display brightnesses, and reference input grayscales are stored; and a second weight lookup table in which weights based on a second display frequency, the reference display brightnesses, and the reference input grayscales are stored, and the first display frequency is different from the second display frequency.

3. The display device according to claim 2, wherein the compensation value determiner further comprises:

a first compensation value lookup table in which compensation values based on the first display frequency and reference positions of the pixels are stored; and a second compensation value lookup table in which compensation values based on the second display frequency and the reference positions are stored.

4. The display device according to claim 3, wherein the compensation value determiner further comprises a first multiplexer which receives an input display frequency, outputs weights included in the first weight lookup table as first weights when the input display frequency is equal to the first display frequency, and outputs weights included in the second weight lookup table as the first weights when the input display frequency is equal to the second display frequency.

5. The display device according to claim 4, wherein the compensation value determiner further comprises a brightness compensator which receives an input display brightness, selects two of the reference display brightnesses for the input display brightness, each having a relatively small difference from the input display brightness, and generates second weights for the input display brightness by interpolating the first weights corresponding to the two of the reference display brightnesses selected for the input display brightness with respect to each of the reference input grayscales.

6. The display device according to claim 5, wherein the compensation value determiner further comprises a grayscale compensator which receives the input grayscales, selects two of the reference input grayscales for an input grayscale of the input grayscales, each having a relatively small difference from the input grayscale, and generates third weights for the input grayscales by interpolating the second weights corresponding to the two of the reference input grayscales selected for each of the input grayscales.

7. The display device according to claim 6, wherein the compensation value determiner further comprises a second multiplexer which receives the input display frequency, outputs compensation values included in the first compensation value lookup table as first compensation values when the input display frequency is equal to the first display frequency, and outputs compensation values included in the second compensation value lookup table as the first compensation values when the input display frequency is equal to the second display frequency.

8. The display device according to claim 7, wherein the compensation value determiner further comprises a position compensator which generates second compensation values for pixels which are not positioned at the reference positions by interpolating the first compensation values.

9. The display device according to claim 8, wherein the compensation value determiner further comprises a final compensation value generator which generates the final compensation values by applying the third weights to the second compensation values.

10. The display device according to claim 9, wherein the final compensation value generator generates the final compensation values by multiplying the third weights by the second compensation values, and the timing controller generates the output grayscales by adding the final compensation values to the input grayscales.

11. A method of driving a display device, the method comprising:

generating final compensation values for an input image;

generating output grayscales by applying the final compensation values to input grayscales for the input image; and displaying an output image corresponding to the output grayscales using pixels, wherein the generating the final compensation values comprises:

determining weights based on display frequencies, display brightnesses, and the input grayscales;

determining compensation values based on the display frequencies and positions of the pixels; and generating the final compensation values by applying the weights to the compensation values.

12. The method according to claim 11, wherein the display device comprises:

a first weight lookup table in which weights based on a first display frequency, reference display brightnesses, and reference input grayscales are stored; and a second weight lookup table in which weights based on a second display frequency, the reference display brightnesses, and the reference input grayscales are stored, and the first display frequency is different from the second display frequency.

13. The method according to claim 12, wherein the display device further comprises:

a first compensation value lookup table in which compensation values based on the first display frequency and reference positions of the pixels are stored; and a second compensation value lookup table in which compensation values based on the second display frequency and the reference positions are stored.

14. The method according to claim 13, wherein the determining the weights comprises:

outputting weights included in the first weight lookup table as first weights when an input display frequency is equal to the first display frequency; and outputting weights included the second weight lookup table as the first weights when the input display frequency is equal to the second display frequency.

15. The method according to claim 14, wherein the determining the weights further comprises:

selecting two of the reference display brightnesses for an input display brightness, each having a relatively small difference from the input display brightness; and generating second weights for the input display brightness by interpolating the first weights corresponding to the two of the reference display brightnesses selected for the input display brightness with respect to each of the reference input grayscales.

16. The method according to claim 15, wherein the determining the weights further comprises:

selecting two of the reference input grayscales for an input grayscale of the input grayscales, each having a relatively small difference from the input grayscale; and generating third weights for the input grayscales by interpolating the second weights of the two of the reference input grayscales selected for each of the input grayscales.

17. The method according to claim 16, wherein the determining the compensation values comprises:

outputting compensation values included in the first compensation value lookup table as first compensation values when the input display frequency is equal to the first display frequency; and outputting compensation values included in the second compensation value lookup table as the first compensation values when the input display frequency is equal to the second display frequency.

18. The method according to claim 17, wherein the determining the compensation values further comprises generating second compensation values for pixels which are not positioned at the reference positions by interpolating the first compensation values.

19. The method according to claim 18, wherein in generating the final compensation values, the final compensation values are generated by applying the third weights to the second compensation values.

20. The method according to claim 19, wherein the final compensation values are generated by multiplying the third weights by the second compensation values, and the output grayscales are generated by adding the final compensation values to the input grayscales.

21. An integrated circuit comprising:

a first circuit unit which generates final compensation values for an input image; and a second circuit unit which receives input grayscales for the input image and generates output grayscales by applying the final compensation values to the input grayscales, wherein the first circuit unit determines weights based on display frequencies, display brightnesses, and the input grayscales, the first circuit unit determines compensation values based on the display frequencies and positions of pixels, and the first circuit unit generates the final compensation values by applying the weights to the compensation values.

22. The integrated circuit according to claim 21, wherein the first circuit unit comprises:

a first weight lookup table in which weights based on a first display frequency, reference display brightnesses, and reference input grayscales are stored; and a second weight lookup table in which weights based on a second display frequency, the reference display brightnesses, and the reference input grayscales are stored, and the first display frequency is different from the second display frequency.

23. The integrated circuit according to claim 22, wherein the first circuit unit further comprises:

a first compensation value lookup table in which compensation values based on the first display frequency and reference positions of the pixels are stored; and a second compensation value lookup table in which compensation values based on the second display frequency and the reference positions are stored.

24. The integrated circuit according to claim 23, wherein the first circuit unit further comprises a first multiplexer which receives an input display frequency, outputs weights included in the first weight lookup table as first weights when the input display frequency is equal to the first display frequency, and outputs weights included in the second weight lookup table as the first weights when the input display frequency is equal to the second display frequency.

25. The integrated circuit according to claim 24, wherein the first circuit unit further comprises a brightness compensator which receives an input display brightness, select two of the reference display brightnesses for the input display brightness, each having a relatively small difference from the input display brightness, and generates second weights for the input display brightness by interpolating the first weights corresponding to the two of the reference display brightnesses selected for the input display brightness with respect to each of the reference input grayscales.

26. The integrated circuit according to claim 25, wherein the first circuit unit further comprises a grayscale compensator which receives the input grayscales, selects two of the reference input grayscales for an input grayscale of the input grayscales, each having a relatively small difference from the input grayscale, and generates third weights for the input grayscales by interpolating the second weights corresponding to the two of the reference input grayscales selected for each of the input grayscales.

27. The integrate circuit according to claim 26, wherein the first circuit unit further comprises a second multiplexer which receives the input display frequency, outputs compensation values included in the first compensation value lookup table as first compensation values when the input display frequency is equal to the first display frequency, and outputs compensation values included in the second compensation value lookup table as the first compensation values when the input display frequency is equal to the second display frequency.

28. The integrated circuit according to claim 27, wherein the first circuit unit further comprises a position compensator which generates second compensation values for pixels which are not positioned at the reference positions by interpolating the first compensation values.

29. The integrated circuit according to claim 28, wherein the first circuit unit further comprises a final compensation value generator which generates the final compensation values by applying the third weights to the second compensation values.

30. The integrated circuit according to claim 29, wherein the final compensation value generator generates the final compensation values by multiplying the third weights by the second compensation values, and the second circuit unit generates the output grayscales by adding the final compensation values to the input grayscales.

* * * * *